United States Patent [19]

Wing

[11] Patent Number: 5,363,805
[45] Date of Patent: Nov. 15, 1994

[54] AUTOMATIC PET FEEDER

[76] Inventor: Lewis O. Wing, P.O. Box 785, Salem, Ark. 72576-0785

[21] Appl. No.: 158,459

[22] Filed: Nov. 29, 1993

[51] Int. Cl.$^5$ ............................................. A01K 5/00
[52] U.S. Cl. ................................................. 119/51.11
[58] Field of Search ............... 119/51.11, 51.12, 51.13, 119/51.14, 51.15, 52.1, 53, 56.1; 222/412, 413

[56] References Cited

U.S. PATENT DOCUMENTS

| | | | |
|---|---|---|---|
| 3,497,109 | 2/1970 | Leach | 119/56.1 X |
| 3,608,786 | 9/1971 | Sheley | 222/413 |
| 3,610,482 | 10/1971 | Steenburgh, Jr. | 222/413 |
| 3,653,360 | 4/1972 | Foster | 119/51.12 |
| 3,715,119 | 2/1973 | Shelley et al. | 222/413 X |
| 4,089,300 | 5/1978 | Keen et al. | 119/52 |
| 4,136,803 | 1/1979 | Tobias et al. | 222/413 |
| 4,291,647 | 9/1981 | Legrain | 119/51.11 |
| 4,665,862 | 5/1987 | Pitchford, Jr. | 119/51.11 |
| 4,733,634 | 3/1988 | Hooser | 119/51.12 |
| 4,841,913 | 6/1989 | Forrer | 119/51.12 |

Primary Examiner—Gene Mancene
Assistant Examiner—Thomas Price
Attorney, Agent, or Firm—Richard L. Miller

[57] ABSTRACT

An automatic pet feeder is provided which consists of a cabinet to sit upon a flat surface. A hopper is built into the cabinet for storing solid food therein so a bowl may be externally positioned adjacent the cabinet on the flat surface. A device is for dispensing some of the solid food from the hopper directly into the bowl, so that a pet can feed from the bowl. An apparatus is provided for programming the dispensing device to control the frequency and the amount of the solid food delivered into the bowl.

6 Claims, 1 Drawing Sheet

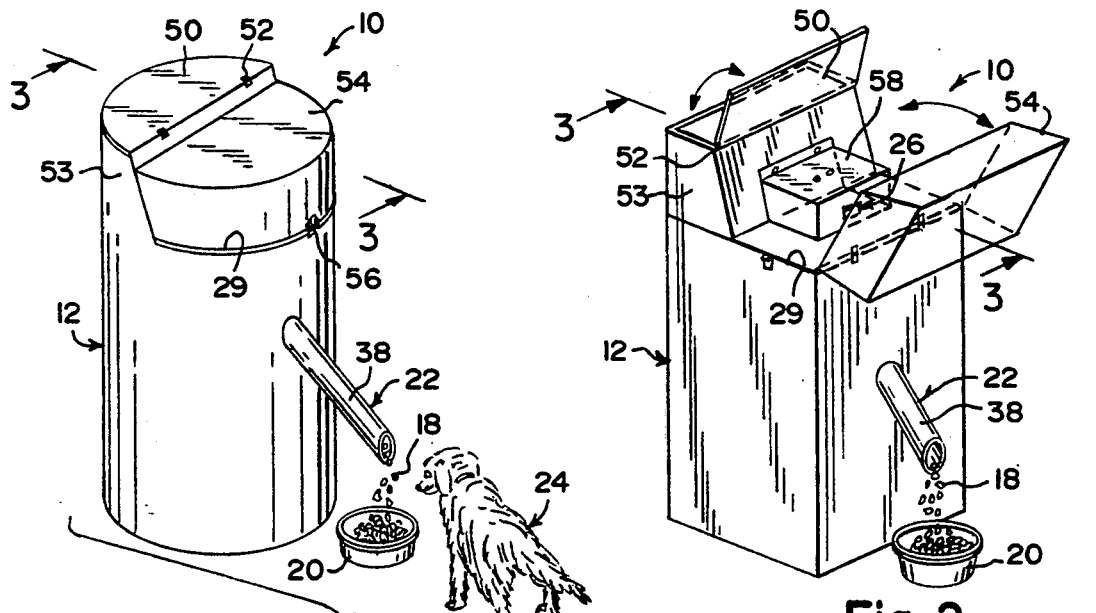
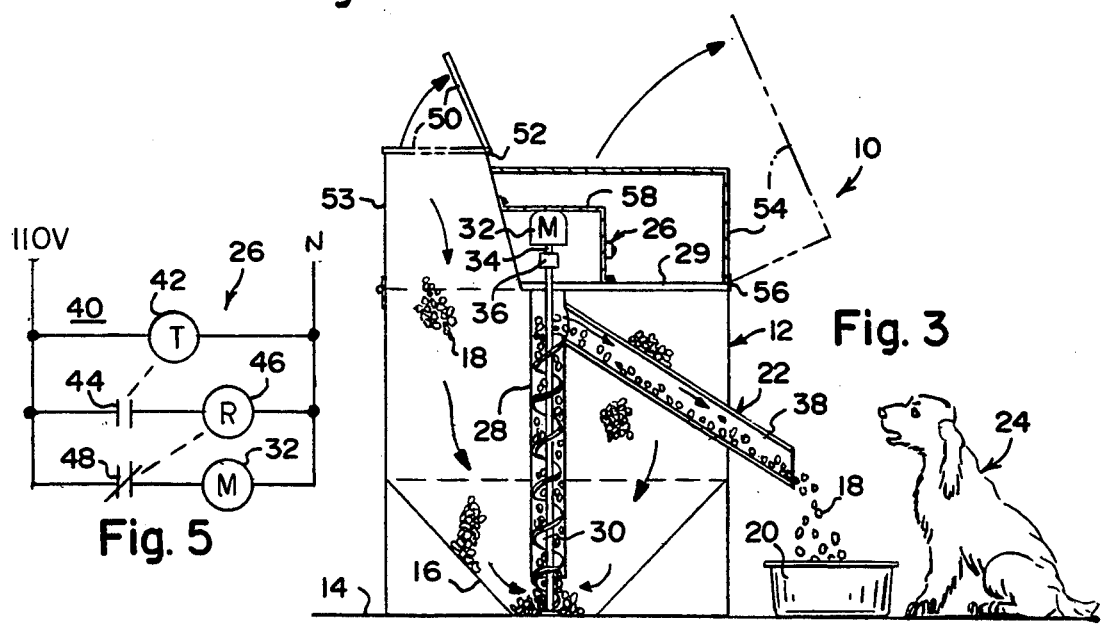
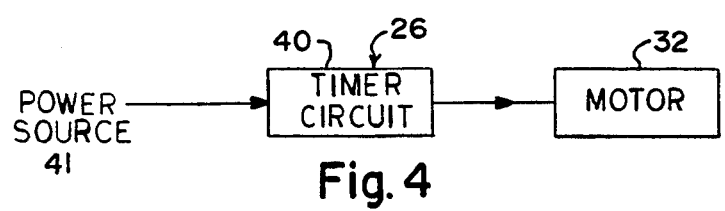

AUTOMATIC PET FEEDER

BACKGROUND OF THE INVENTION

The instant invention relates generally to animal food dispensing devices and more specifically it relates to an automatic pet feeder.

Numerous animal food dispensing devices have been provided in prior art that are adapted to supply constant quantities of food and water to animals. For example, U.S. Pat. Nos. 3,653,360 to Foster; 4,089,300 to Keen et al.; 4,733,634 to Hooser and 4,841,913 to Forrer all are illustrative of such prior art. While these units may be suitable for the particular purpose to which they address, they would not be as suitable for the purposes of the present invention as heretofore described.

SUMMARY OF THE INVENTION

A primary object of the present invention is to provide an automatic pet feeder that will overcome the shortcomings of the prior art devices.

Another object is to provide an automatic pet feeder that can be programmed to feed solid food once or multiple times per day, with each feeding metered to a desired amount.

An additional object is to provide an automatic pet feeder in which a pet is fed every day with the same amount of food at each feeding, being a controlled feeding rather than free feeding.

A further object is to provide an automatic pet feeder that is simple and easy to use.

A still further object is to provide an automatic pet feeder that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The Figures on the drawings are briefly described as follows:

FIG. 1 is a diagrammatic perspective view of a first embodiment of the instant invention;

FIG. 2 is a diagrammatic perspective view of a second embodiment of the instant invention;

FIG. 3 is substantially an enlarged diagrammatic cross sectional view taken on line 3—3 of either FIG. 1 or FIG. 2;

FIG. 4 is a block diagram of the instant invention; and

FIG. 5 is an electrical schematic diagram of the instant invention.

DETAILED DESCRIPTION OF THE PREFERRED EMBODIMENTS

Turning now descriptively to the drawings, in which same reference characters denote same elements throughout the several views, FIGS. 1 through 5 illustrate an automatic pet feeder 10, which consists of a cabinet 12 to sit upon a flat surface 14. A hopper 16 is built into the cabinet 12 for storing solid food 18 therein. A bowl 20 is externally positioned adjacent the cabinet 12 on the flat surface 14. A device 22 is for dispensing some of the solid food 18 from the hopper 16 directly into the bowl 20, so that a pet 24 can feed from the bowl 20. An apparatus 26 is for programming the dispensing device 22, to control the frequency of delivery of the solid food 18 into the bowl 20.

The dispensing device 22, as best seen in FIG. 3, includes a vertical pipe 28 suspended from the top 29 of the cabinet 12 extending through the center of the hopper 16 in which a bottom end of the vertical pipe 28 is spaced above the bottom of the hopper 16. An auger 30 is rotatively positioned through the vertical pipe 28 to the bottom of the hopper 16. An electric motor 32 having a drive shaft 34 is mounted onto the top 29 of the cabinet 12, with the drive shaft 34 coupled at 36 to the auger 30. An outlet feed tube 38 extends at an angle downwardly from a top end of the vertical pipe 28 and outwardly from one side of the cabinet 12. When the motor 32 is activated, the drive shaft 34 will rotate the auger 30 to lift some of the solid food 18 up through the vertical pipe 28 and into the outlet feed tube 38, to deposit the solid food 18 into the bowl 20.

The programming apparatus 26 is a timer circuit 40 electrically connected between the motor 32 and a power source 42 on top of the cabinet 12. The timer circuit 40, as best seen in FIG. 5, contains a twenty four hour timer 42, with normally opened contact 44, a delay "on" relay 46 have normally open contacts 48 which stay delayed closed when activated for an appropriate programmable time interval of zero to one hundred and eighty seconds. The timer 42 will close the normally opened contact 44 momentarily at a set time, thus starting the delay "on" relay 46 for the appropriate programmed time interval of zero to one hundred and eighty seconds. This causes the motor 32 to operate at a pre-set time, for a preprogrammed interval until, the contacts 48 of the delay relay 46 then reset to the normally open position, thus resetting the instant invention for the next feeding. It is to be noted that the delay "on" relay is some times referred to as a delay relay and is a relay in this case in which there is a delay between the time it is de-energized and the time the contacts open.

A lid 50 is hinged at 52 to an extended top portion 53 of the cabinet 12, so that the lid 50 can pivot open for the solid food 18 to be deposited into the hopper 16. A cover 54 is hinged at 56 to the top 57 of the cabinet 12, so that the cover 54 can pivot open to expose the motor 32 and the programming apparatus 26, with timer circuit 40. A bracket 58 is attached between the extended top portion 53 and the top 29 of the cabinet 12, so as to mount the motor 32 and the timer circuit 40 thereto.

The cabinet 12, the lid 50 and the cover 54 can be circular shaped, as shown in FIG. 1, or box shaped, as shown in FIG. 2. This will in no way effect the operation of the automatic pet feeder 10 as described above.

OPERATION OF THE INVENTION

To use the automatic pet feeder 10, simply open the lid 50 and deposit solid food 18 into the hopper 16 until it is full. Close the lid 50 and open the cover 54 to set the timer circuit 40 to operate the motor 32 at proper feeding intervals. The delay interval can either be factory set in the delay relay or adjustable by the user depending upon the design choice of the manufacture so that an appropriate amount of food will be dispensed. Close the cover 54 and place the bowl 20 directly under the outlet feed tube 38 on the flat surface 14. The pet 24 can now feed whenever the proper amount of solid food drops into the bowl 20.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An automatic pet feeder which comprises:
   a) a cabinet to sit upon a flat supporting surface so a bowl can be placed adjacent thereto;
   b) a hopper built into said cabinet for storing solid food therein;
   c) means for dispensing some of the solid food from said hopper directing into said bowl, so that a pet can feed from said bowl; comprising a vertical pipe suspended from the top of said cabinet to extend through the center of said hopper in which a bottom end of said vertical pipe is spaced above the bottom of said hopper;
   an auger rotatively positioned through said vertical pipe to the bottom of said hopper;
   an electric motor having a drive shaft, said motor mounted onto the top of said cabinet, with said drive shaft coupled to said auger; and
   an outlet feed tube extending at an angle downwardly from a top end of said vertical pipe and outwardly from one side of said cabinet to a location adjacent the level of the flat supporting surface $_d$ so that when said motor is activated the drive shaft will rotate said auger to lift some of the solid food up through said vertical pipe and into said outlet feed tube so that the solid food falls down said outlet feed tube into said bowl; and
   d) means for programming said dispensing means to control the frequency of delivery of the solid food into said bowl.

2. An automatic pet feeder as recited in claim 1 wherein said programming means is a timer circuit electrically connected between said motor and a power source on the top of said cabinet.

3. An automatic pet feeder as recited in claim 2, wherein said timer circuit includes a twenty four hour timer, having a normally opened contact, a delay "on" relay and having a normally open contact which will delay closed for an appropriate time interval when activated, whereby said timer will close said normally opened contact at a set time, thus starting said delay "on" relay, causing said motor to operate at a pre-set time, for a said appropriated time interval, whereby a predetermined amount of food is dispensed.

4. An automatic pet feeder as recited in claim 3, further including:
   a) a lid hinged to an extended top portion of said cabinet, so that said lid can pivot open for the solid food to be deposited into said hopper;
   b) a cover hinged to the top of said cabinet, so that said cover can pivot open to expose said motor and said timer circuit; and
   c) a bracket attached between the extended top portion and the top of said cabinet, so as to mount said motor and said timer circuit thereto.

5. An automatic pet feeder as recited in claim 4, wherein said appropriate time interval for said delay "on" relay may be adjusted between zero to one hundred and eighty seconds.

6. An automobile pet feeder as recited in claim 1, wherein said outlet feed tube is permanently open.

* * * * *